United States Patent
Ikeno et al.

(10) Patent No.: US 8,147,105 B2
(45) Date of Patent: Apr. 3, 2012

(54) TURN LAMP UNIT

(75) Inventors: Shungo Ikeno, Fujieda (JP); Masahiro Motomiya, Fujieda (JP); Akira Fukai, Shimada (JP); Ryo Inuzuka, Fujieda (JP)

(73) Assignee: Murakami, Corporation, Shizuoka (JP)

( * ) Notice: Subject to any disclaimer, the term of this patent is extended or adjusted under 35 U.S.C. 154(b) by 226 days.

(21) Appl. No.: 12/708,936

(22) Filed: Feb. 19, 2010

(65) Prior Publication Data

US 2010/0302793 A1   Dec. 2, 2010

(30) Foreign Application Priority Data

May 28, 2009   (JP) ................. 2009-129074

(51) Int. Cl.
*B60Q 1/00*   (2006.01)
(52) U.S. Cl. ......... 362/519; 362/494; 362/498; 362/548
(58) Field of Classification Search .................. 362/494, 362/498, 546, 547, 548, 549, 519
See application file for complete search history.

(56) References Cited

U.S. PATENT DOCUMENTS

| 7,048,420 B2 * | 5/2006 | Arakawa ....................... 362/494 |
| 7,594,742 B2 * | 9/2009 | Apfelbeck et al. ............ 362/494 |
| 7,771,064 B2 * | 8/2010 | Kobayashi et al. ........... 359/841 |

FOREIGN PATENT DOCUMENTS

JP   2006-49218   2/2006

* cited by examiner

*Primary Examiner* — John A Ward
(74) *Attorney, Agent, or Firm* — Greenblum & Bernstein P.L.C.

(57) ABSTRACT

For a turn lamp unit, a reflecting member is disposed in an inner space formed by a housing and lens section, wherein the reflecting member is fixed to the housing by a screw. The head portion of the screw is disposed inside a screw housing space arranged at the housing, and an opening of the screw housing space is closed by a waterproof moisture-transmission section. Further, since the inner space and screw housing space are communicated with each other through a breathing hole, one end of the breathing hole is continuous with the inside of the screw housing space closed by the waterproof moisture-transmission section, and the other end of the breathing section is continuous with the inside of the inner space.

7 Claims, 9 Drawing Sheets

TURN LAMP UNIT

BACKGROUND OF THE INVENTION

1. Field of the Invention

The present invention relates to a turn lamp unit to be fitted to a side mirror for a vehicle for use.

2. Related Background Art

A prior art in this field is disclosed in Japanese Unexamined Patent Application Publication No. 2006-49218. A turn lamp unit described in this publication has an inner panel disposed in an inner space formed by a lamp housing and a lamp lens, wherein LEDs are fixed to the lamp housing and light from the LEDs is projected through a light projecting hole provided on the inner panel toward the lamp lens. Further, because a reflecting surface formed on the surface of the inner panel reflects light, the lamp lens can be lighted uniformly and efficiently by light projected from the LEDs. The inner panel is screw-fixed to the lamp housing. Still further, a lamp housing is provided in general with a breathing hole for exhausting moisture from the inside of the inner space that is tightly closed by the lamp housing and lamp lens, and the breathing hole prevents the surfaces of the inner side and reflecting surface of the lamp lens from being fogged.

[Patent Document 1] Japanese Unexamined Patent Publication No. 2006-49218

SUMMARY OF THE INVENTION

Problems to be Solved by the Invention

However, for the existing turn lamp unit described above, when the inner panel is fixed to the lamp housing, the screw needs to be sealed because water enters inside the lamp housing from outside via a screw. Further, it becomes necessary to take measures to prevent water from entering inside the lamp housing through the breathing hole, which causes a problem of complicating a structure for measures against water.

An object of the present invention is to provide a turn lamp unit aimed at simplification of the structure.

Means for Solving the Problems

The present invention provides a turn lamp unit integrally fittable to a side mirror for a vehicle, the turn lamp unit including: a housing to be fixed to the side mirror; a lens section fixed to the housing and disposed so as to be exposed from the side mirror; a reflecting member disposed in an inner space formed by the housing and the lens section, for reflecting light from a light source toward the lens section; a screw for fixing the reflecting member to the housing; a screw housing space arranged integrally with the housing so as to surround a periphery of a head portion of the screw disposed on the housing side; a breathing hole formed at the housing for communication between the inner space and the screw housing space; and a waterproof moisture-transmission section for sealing an opening of the screw housing space.

In this turn lamp unit, the reflecting member is disposed in the inner space formed by the housing and the lens section and is fixed to the housing by a screw. The head portion of the screw is disposed in the screw housing space provided at the housing, and the opening of the screw housing space is closed by the waterproof moisture-transmission section. Further, the inner space and screw housing space are communicated with each other through the breathing hole. Thus, one end of the breathing hole is continuous with the inside of the screw housing space closed by the waterproof moisture-transmission section, while the other end of the breathing hole is continuous with the inside of the inner space. The turn lamp unit with such a structure does not need sealing of the screw with a packing or the like as measures against water, and thereby the number of components and the assembly work process can be reduced. Further, since the screw and breathing hole can be disposed at one location without being disposed apart at separate positions, the simplification of the structure and the reduction in space can be achieved. Still further, since the head portion of the screw is covered by the waterproof moisture-transmission section, the external appearance quality can be improved. Yet further, since rainwater having entered inside the side mirror does not directly hit against the screw, anti-corrosion effect for the screw is also ensured.

Further, the breathing hole is preferably located on an upper side in the inner space in a state where the turn lamp unit is fitted to the side mirror. When the light source is a bulb, the bulb itself generates heat, and when the light source is an LED, electronic parts on the control circuit substrate generate heat. Because such heat stays in the upper portion of the inner space, the heat can be easily exhausted by arranging the breathing hole on the upper side of the inner space.

Still further, the breathing hole is preferably located on an upper side of the screw in the screw housing space in a state where the turn lamp unit is fitted to the side mirror. When the light source is a bulb, the bulb itself generates heat, and when the light source is an LED, electronic parts on the control circuit substrate generate heat. Because such heat remains in the upper side of the screw housing space, the heat can be easily exhausted by arranging the breathing hole on the upper side of the screw housing space.

Yet further, it is preferable that a control circuit substrate connected with the light source is disposed adjacent to the breathing hole. By employing such a structure, heat generated from the electronic parts on the control circuit substrate becomes easily exhausted from the breathing hole.

Further, the screw housing space is preferably formed as a recessed portion depressed at an outer surface of the housing. Because the screw housing space does not protrude from the outer surface of the housing, the space inside the door mirror body of the side mirror can be effectively used.

Still further, it is preferable that a boss section formed on a rear surface of the reflecting member is provided with a female screw section screwed with the screw, and an inner surface of the housing is formed with a guide wall in which the boss section is fitted. By employing such a structure, the accuracy of the position alignment between the housing and reflecting member and the assembling workability can be improved.

Yet further, it is preferable that a part of the guide wall is cut off, and the breathing hole is exposed from the cut-off section. The breathing hole is not closed by the boss section even in a state where the boss section is fitted in the guide wall.

Effect of the Invention

According to the invention, the structure can be simplified.

DESCRIPTION OF THE PREFERRED EMBODIMENTS

Figure 1:
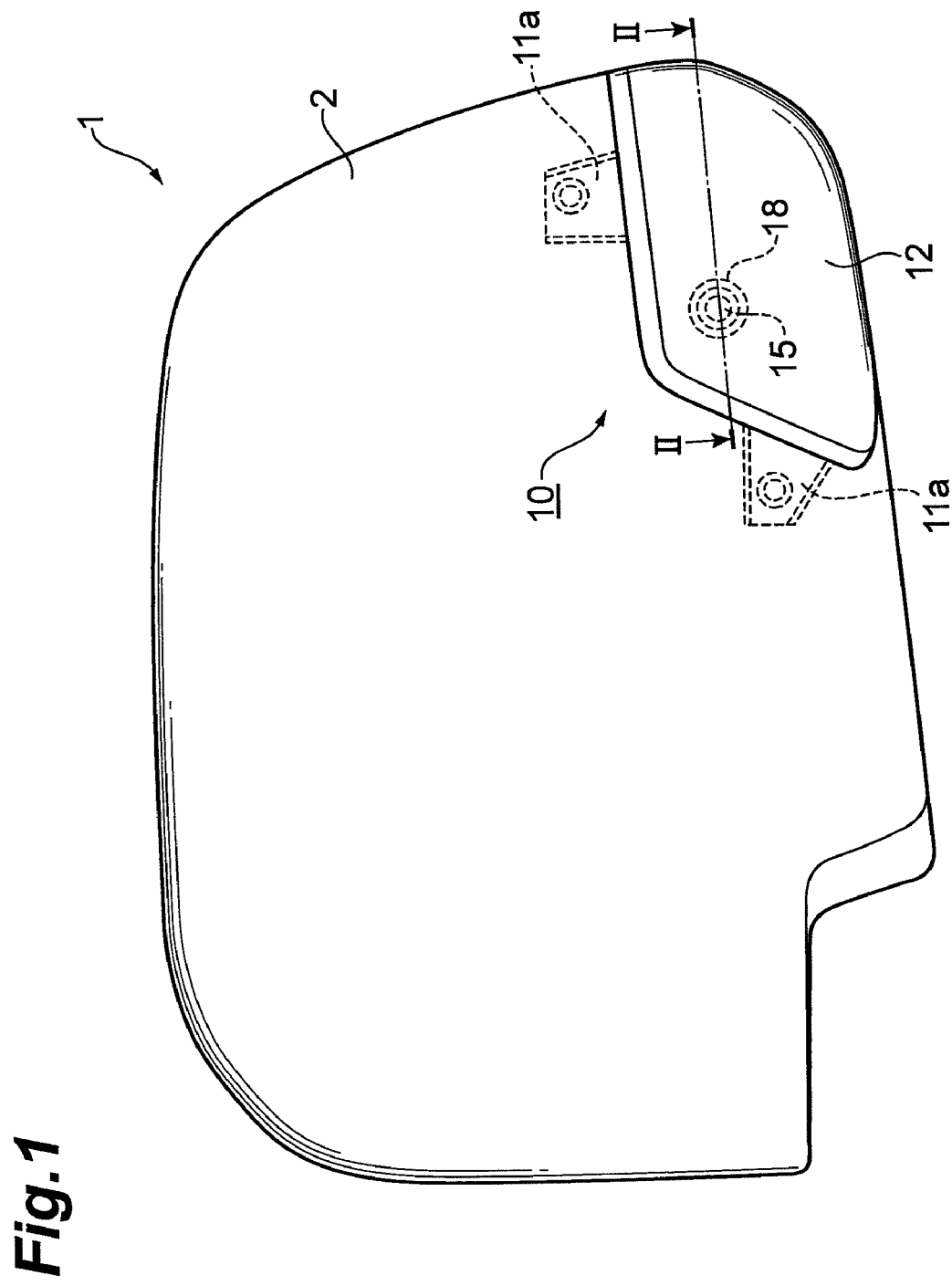
FIG. 1 is a rear view of a side mirror applied with a turn lamp unit in a first embodiment in accordance with the invention.

Hereinafter, preferred embodiments of turn lamp units in accordance with the invention will be described referring to the drawings.

First Embodiment

As shown in FIG. 1, a door mirror 1, as an example of a side mirror for a vehicle, is provided with a resin-made door mirror body 2 that is in a bowl shape, fixed through an arm section to a door panel on the front side. A reflecting mirror is arranged so as to close the recessed portion of a partition plate of the door mirror body 2. This reflecting mirror can be changed to a desired angle by switching operation in the vehicle.

A turn lamp unit 10 is arranged on the rear surface side of the door mirror body 2. The unitization of the turn lamp unit 10 allows easy incorporation into the door mirror 1 in the manufacturing process of the door mirror 1, and is easily applied to door mirrors having various structures while maintaining a certain quality level.

Figure 2:
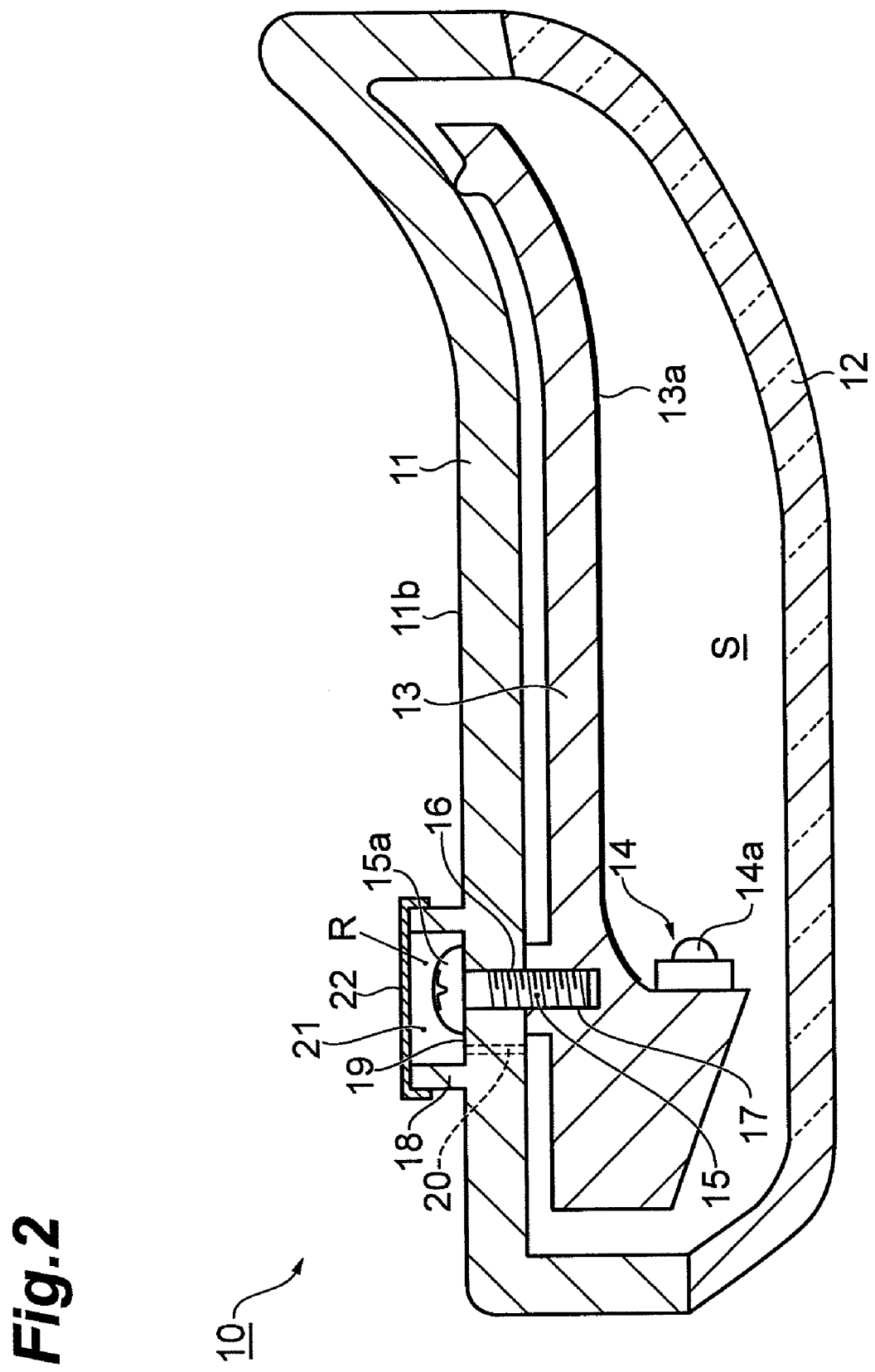
FIG. 2 is a cross-sectional view along line II-II in FIG. 1.

As shown in FIGS. 1 and 2, the turn lamp unit 10 is provided with a resin-made housing 11 that functions as a body. The housing 11 is integrally formed with a fitting bracket 11a that can be screw-fixed to a reinforcing rib formed inside the door mirror 1. An opening-side peripheral margin of a transparent resin-made lens section 12 is fixed by welding to the opening-side peripheral margin of the housing 11. The inner space S formed by the housing 11 and lens section 12 is formed as a space that is tightly closed to prevent water penetration.

A reflecting member 13 for projecting light toward the lens section 12 is housed in the inner space S, and a reflecting surface 13a is formed by aluminum deposition on the surface of the reflecting member 13 made of a resin. Light sources 14 provided with two to five LEDs 14a in parallel are fixed on the reflecting surface 13a side of the end portion of the reflecting member 13, and each of the light sources 14 is arrayed on a control circuit substrate (not shown). This control circuit substrate is wired with a connector terminal for external connection (not shown) provided on the housing 11.

Figure 3:
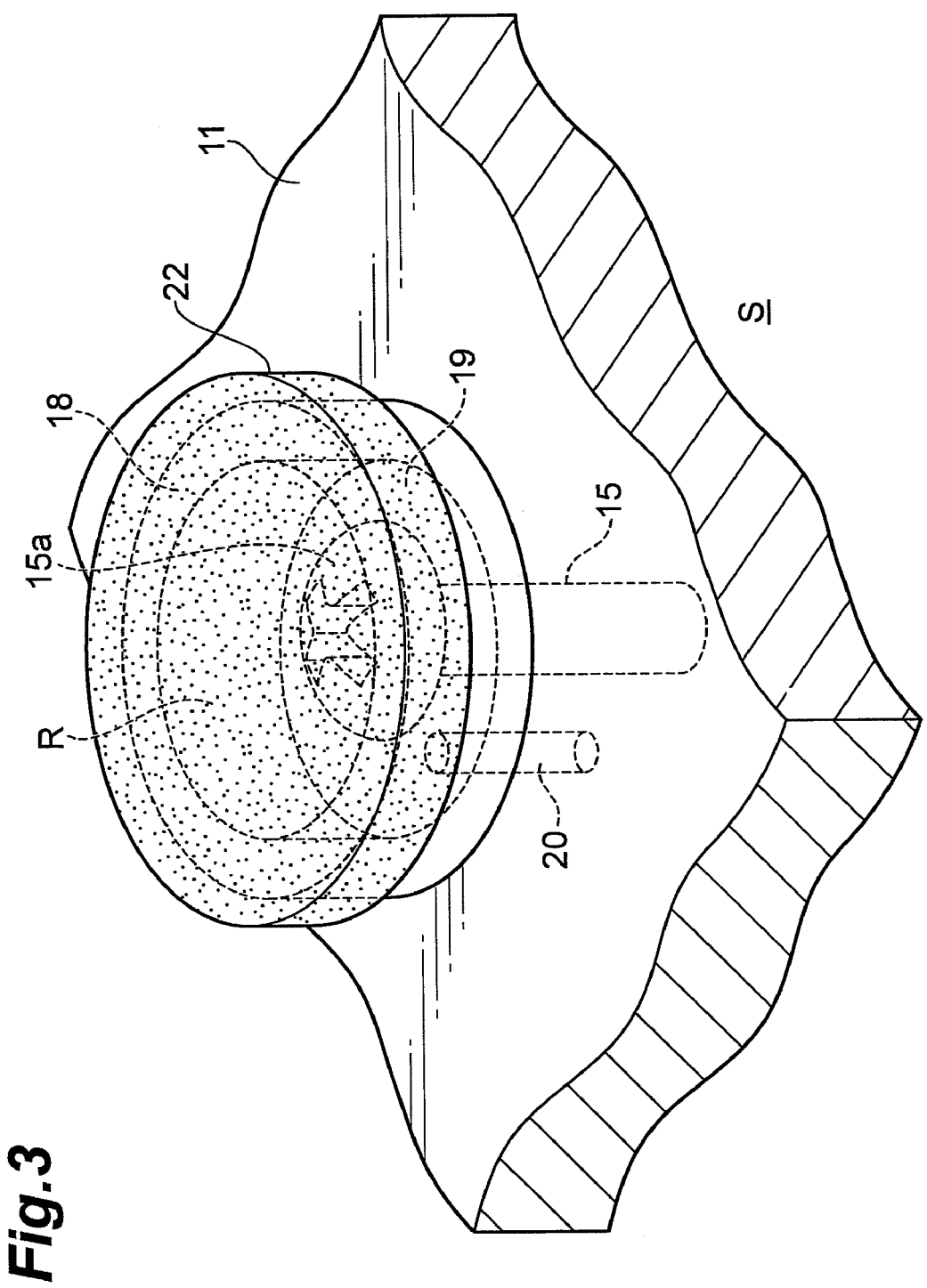
FIG. 3 is an enlarged perspective view of a main part of the turn lamp unit.

As shown in FIGS. 2 and 3, the reflecting member 13 is locked by the housing 11, thereby the position thereof being defined in the inner space S, and is fixed to the housing 11 by a screw 15. The housing 11 is formed with a through-hole 16 in which the screw 15 is inserted, while the reflecting member 13 is formed with a female screw section 17 screwed with the screw 15.

Further, the rear surface 11b of the housing 11 is integrally formed with a surrounding wall 18 protruding in a cylindrical shape so as to surround the head portion 15a of the screw 15. The inside of the surrounding wall 18 is formed as a screw housing space R, wherein the head portion 15a of the screw 15 is in tight contact with the bottom surface 19 of the screw housing space R without a gap therebetween. Moreover, the housing 11 is formed with a breathing hole 20 for communication between the inner space S and screw housing space R. One end of the breathing hole 20 is continuous with the inside of the screw housing space R, while the other end of the breathing hole 20 is continuous with the inside of the inner space S.

The opening 21 of the screw housing space R is sealed by a sheet-like or cap-like waterproof moisture-transmission section 22. The waterproof moisture-transmission section 22 is formed of a material that blocks water and transmits moisture. Because of the waterproof moisture-transmission section 22, water does not stay in the screw housing space R, and the moisture in the inner space S passes through the breathing 20 to be exhausted outside by the waterproof moisture-transmission section 22.

The turn lamp unit 10 having such a structure does not need sealing of the screw 15 by a packing or the like as measures against water, and thereby the number of components and the assembly work process can be reduced. Further, as the screw 15 and breathing hole 20 can be disposed at one location without being disposed apart at separate positions, the simplification of the structure and the reduction in space can be achieved. Still further, since the head portion 15a of the screw 15 is covered by the waterproof moisture-transmission section 22, the external appearance quality can be improved. Yet further, since rainwater or carwash water having entered inside the door mirror 1 does not directly hit against the screw 15, anti-corrosion effect for the screw 15 is also ensured.

Second Embodiment

Next, a second embodiment of a turn lamp unit in accordance with the invention will be described. Elements being the same as or similar to those in the first embodiment will be given with the same reference symbols, and overlapping description will be omitted.

Figure 4:
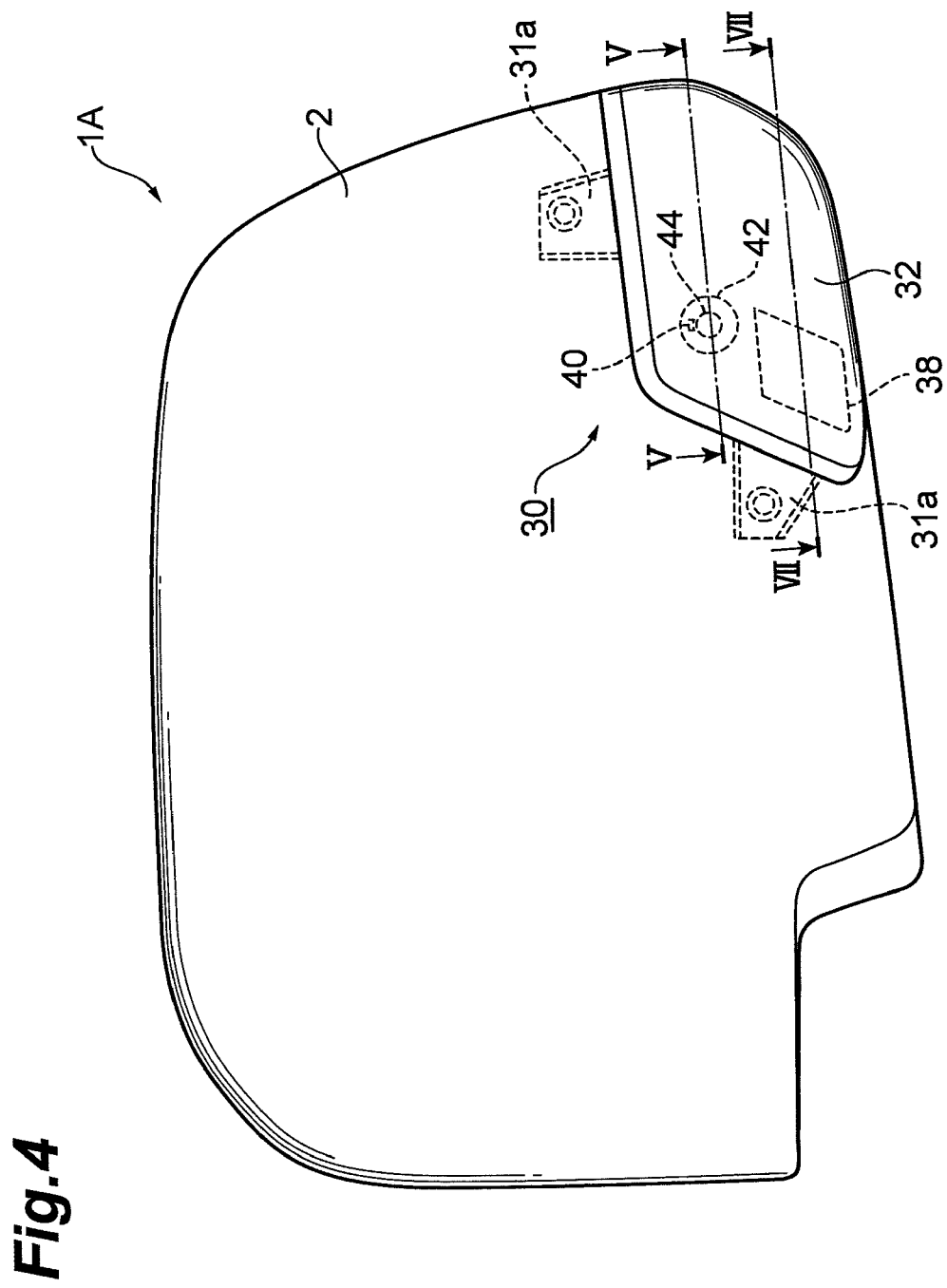
FIG. 4 is a rear view of a side mirror applied with a turn lamp unit in a second embodiment in accordance with the invention.
Figure 5:
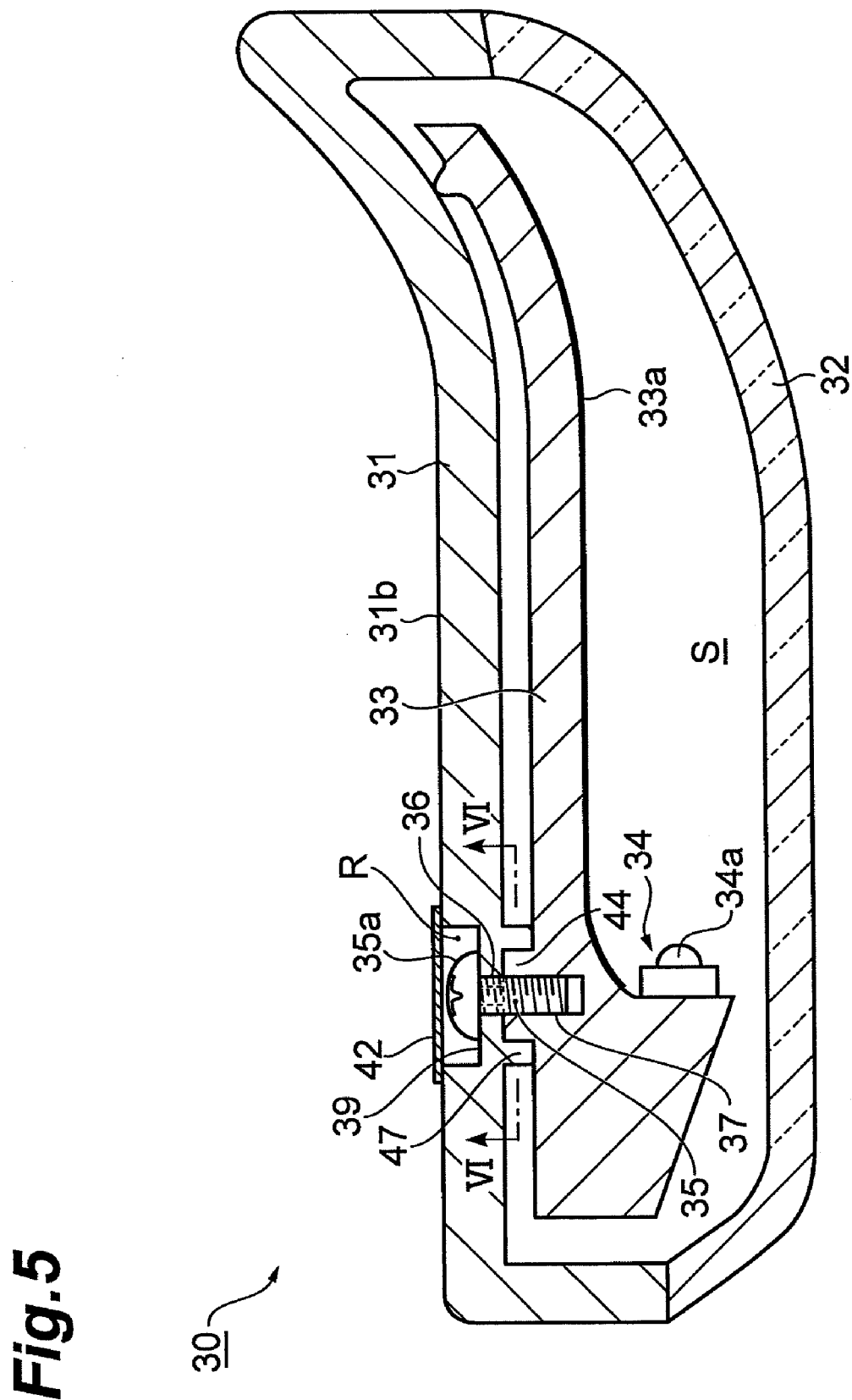
FIG. 5 is a cross-sectional view along line V-V in FIG. 4.

As shown in FIGS. 4 and 5, a turn lamp unit 30 applied to a door mirror 1A is provided with a resin-made housing 31 that functions as a body. The housing 31 is integrally formed with a fitting bracket 31a that can be screw-fixed to a reinforcing rib formed inside the door mirror 1A. An opening side peripheral margin of a transparent resin-made lens section 32 is fixed by welding to the opening side peripheral margin of the housing 31. The inner space S formed by the housing 31 and lens section 32 is formed as a space that is tightly closed to prevent water penetration.

A reflecting member 33 for projecting light toward the lens section 32 is housed in the inner space S, and a reflecting surface 33a is formed by aluminum deposition on the surface of the reflecting member 33 made of a resin. Light sources 34 provided with two to five LEDs 34a in parallel are fixed on the reflecting surface 33a side of the end portion of the reflecting member 33, and each of the light sources 34 is subjected to lighting control by a control circuit substrate 38. The control circuit substrate 38 is wired with a connector terminal (not shown) provided on the housing 31 for external connection.

As shown in FIGS. 2 and 3, the position of the reflecting member 33 is defined in the inner space S, and the reflecting member 33 is fixed to the housing 31 by a screw 35. The housing 31 is formed with a through-hole 36 in which the screw 35 is inserted, while the reflecting member 33 is formed with a female screw section 37 screwed with the screw 35.

Further, the rear surface 31b of the housing 31 is formed with a screw housing space R as a recessed portion depressed, wherein the head portion 35a of the screw 35 is housed in the screw housing space R. The head portion 35a of the screw 35 is in tight contact with the bottom surface 39 of the screw housing space R without a gap therebetween. Thus, the screw housing space R does not protrude from the rear surface 31b of the housing 31, and accordingly, the space in the door mirror body 2 of the side mirror 1A can be effectively used.

Still further, the housing 31 is formed with a breathing hole 40 for communication between the inner space S and the screw housing space R. One end of the breathing hole 40 is continuous with the inside of the screw housing space R, and the other end of the breathing hole 40 is continuous with the inside of the inner space S.

The opening 41 (see FIG. 6) of the screw housing space R is sealed by a sheet-like or cap-like waterproof moisture-transmission section 42. The waterproof moisture-transmission section 42 fixed and attached to the housing 31 is formed of a material that blocks water and transmits moisture. Because of the waterproof moisture-transmission section 42, water does not stay in the screw housing space R, and the moisture in the inner space S passes through the breathing 40 to be exhausted outside by the waterproof moisture-transmission section 42.

Yet further, the breathing hole 40 is located on the upper side in the inner space S. As the light sources 34 are LEDs 34a, electronic parts on the control circuit substrate 8 generate heat. Since this heat transfers and stays in the upper portion of the inner surface S, it becomes easy to exhaust this heat through the breathing hole 40 located on the upper side of the inner space S.

Figure 6:
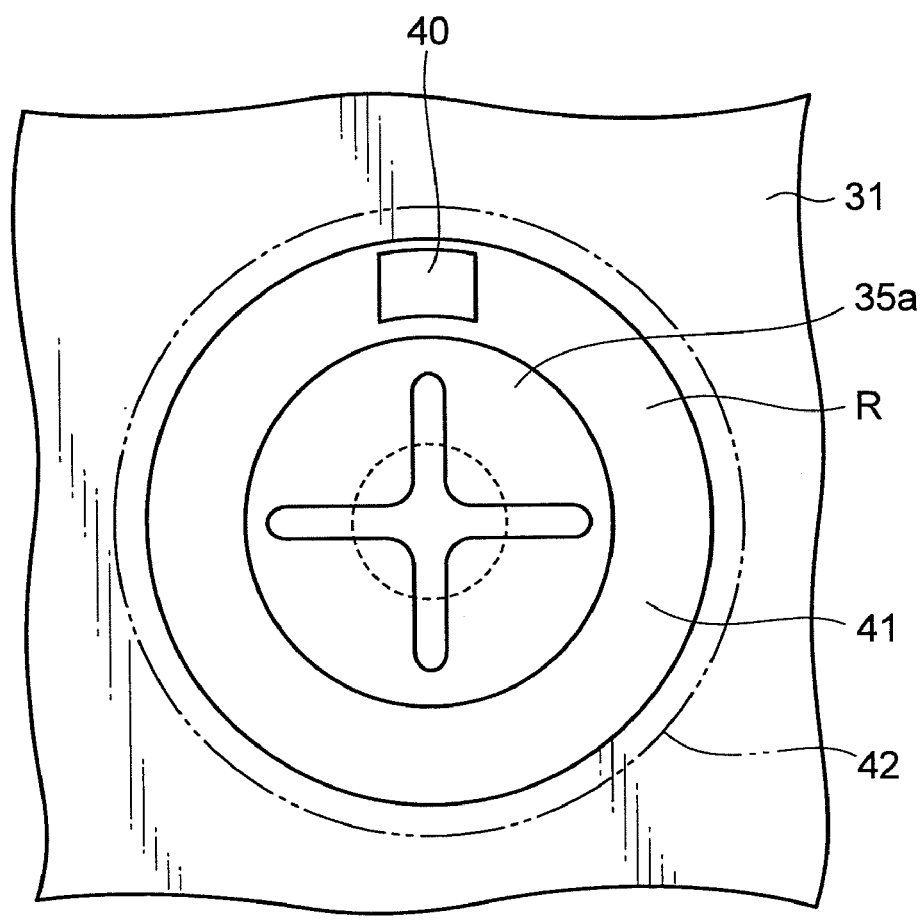
FIG. 6 is a plan view showing a screw housing space.

Further, as shown in FIG. 6, the breathing hole 40 is disposed on the upper side of the head portion 35a of the screw 35 in the screw housing space R. As the light sources 34 are LEDs 34a, electronic parts on the control circuit substrate 38 generate heat. Since this heat transfers and stays in the upper portion of the screw housing space R, it becomes easy to exhaust this heat through the breathing hole 40 located on the upper side of the screw housing space R.

Figure 7:
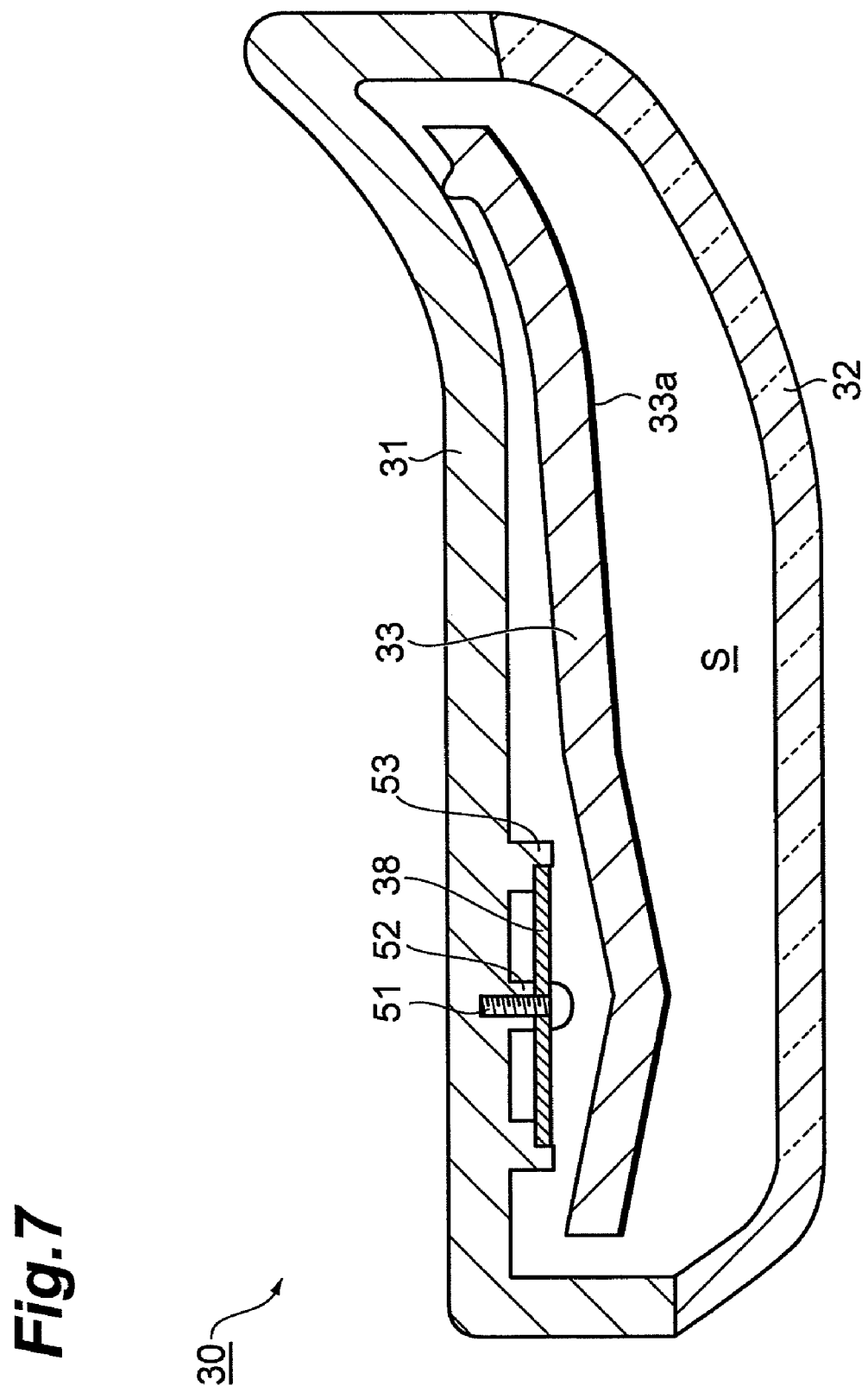
FIG. 7 is a cross-sectional view along line VII-VII in FIG. 4.

Still further, as shown in FIGS. 4 and 7, the control circuit substrate 38 connected with the LEDs 34a is disposed adjacent to the breathing hole 40. By employing such a structure, the heat generated by the electronic parts on the control circuit substrate 38 becomes easily exhausted through the breathing hole 40.

The control circuit substrate 38 is disposed facing the rear surface side of the reflecting member 33, and is fixed by a screw 51 to the housing 31. The center of the control circuit substrate 38 is supported by a boss section 52 formed on the housing 31, and the peripheral margin of the control circuit substrate 38 is supported by a frame portion 53 formed on the housing 31. Thus, the rear surface of the control circuit substrate 38 can be maintained to be in a state out of contact with other elements.

Figure 8:
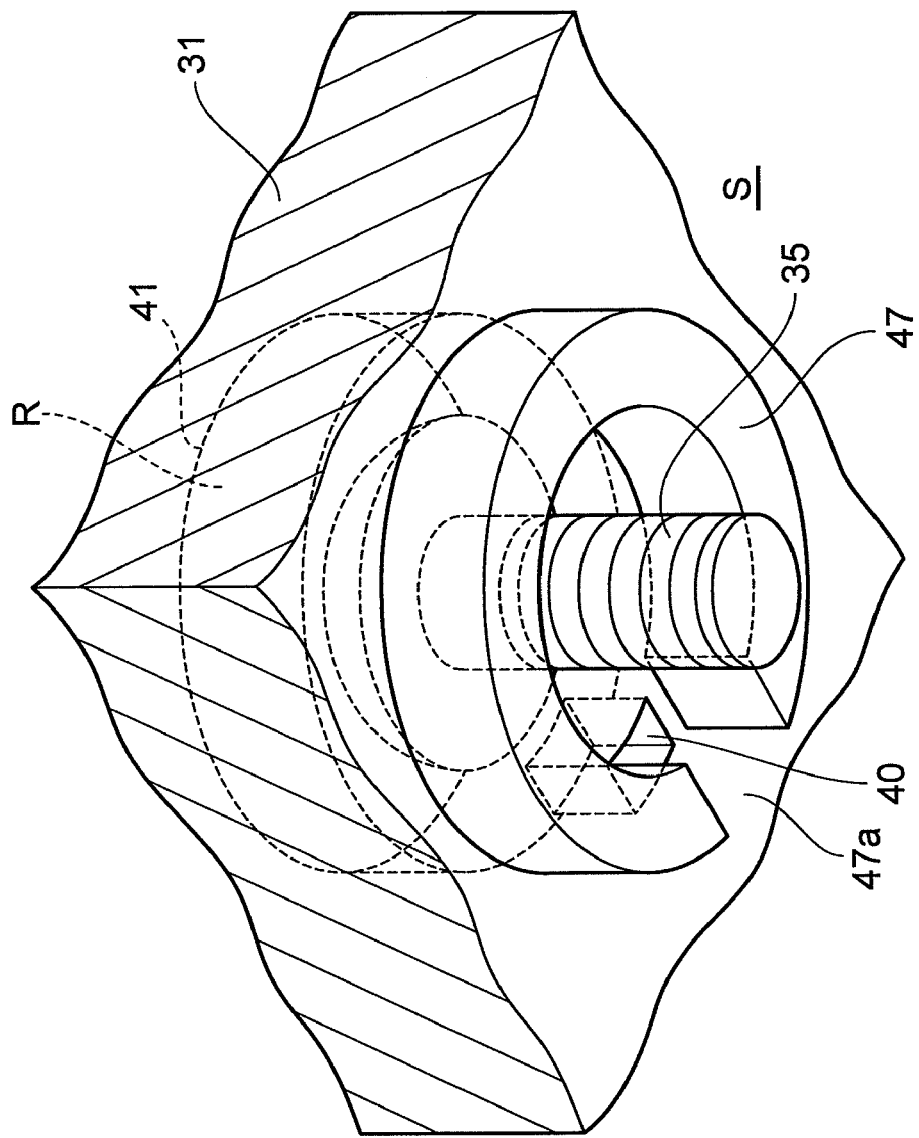
FIG. 8 is a perspective view showing a guide wall.
Figure 9:
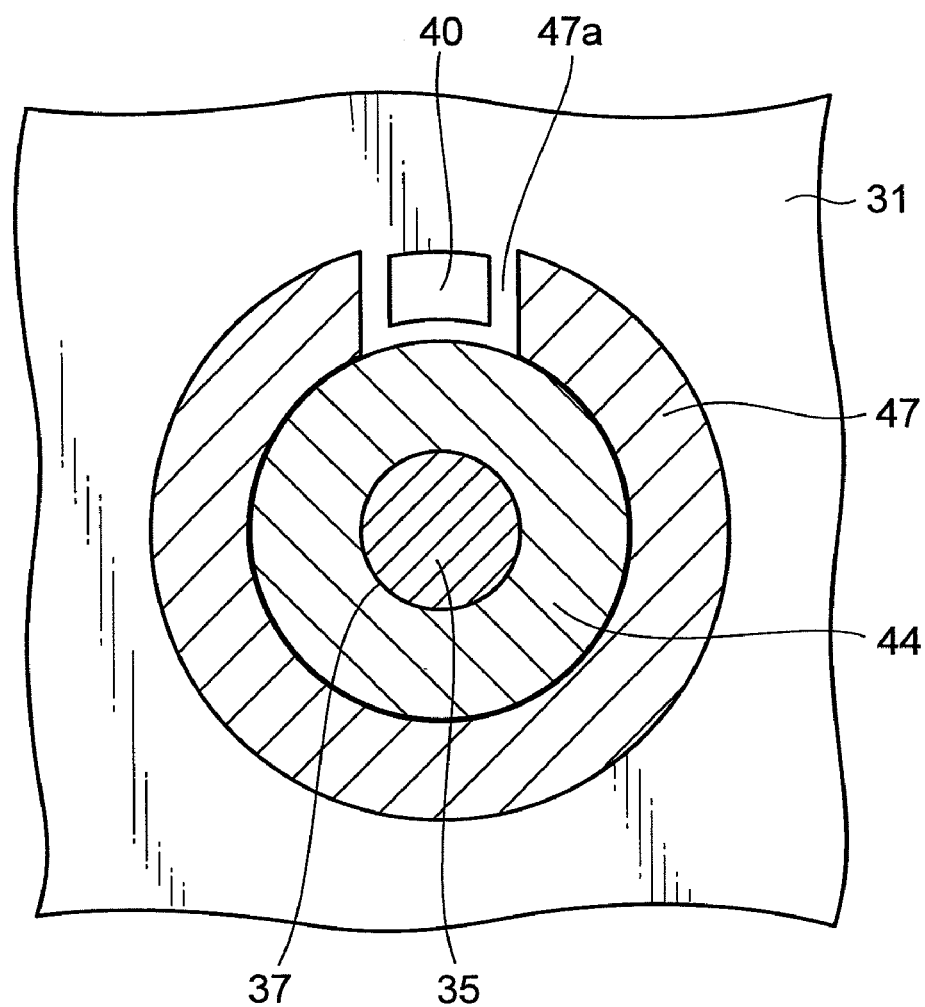
FIG. 9 is a cross-sectional view showing a state where a boss section is fitted inside the guide wall.

As shown in FIGS. 5, 8, and 9, the rear surface of the reflecting member 33 is formed with a cylindrical boss section 44. The boss section 44 is formed with a female screw section 37 screwed with the screw 35. On the other hand, the inner surface of the housing 31 is formed with a ring-shaped guide wall 47 into which the boss section 44 is fitted. By employing such a structure, the boss section 44 can be fitted into the guide wall 47. Thus, the accuracy of the position alignment between the housing 31 and the reflecting member 33, and the assembling workability can be improved.

Yet further, the upper portion of the guide wall 47 is cut off, and the breathing hole 40 is exposed from this cut-off portion 47a. Therefore, even in a state where the boss section 44 is fitted in the guide wall 47, the breathing hole 40 is prevented from being closed by the boss section 44.

The turn lamp unit 30 in accordance with the forgoing second embodiment does not need sealing of the screw 35 by a packing or the like as measures against water, and thereby the number of components and the assembly work process can be reduced. Further, since the screw 35 and breathing hole 40 can be disposed at one location without being disposed apart at separate positions, the simplification of the structure and the reduction in space can be achieved. Still further, since the head portion 35a of the screw 35 is covered by the waterproof moisture-transmission section 42, the external appearance quality can be improved. Yet further, since rainwater or carwash water having entered inside the door mirror 1 does not directly hit against the screw 35, anti-corrosion effect for the screw 35 is also ensured.

Needless to say, the present invention is not limited to the foregoing embodiments. For example, the number of breathing holes 40 may be plural. Further, the size and shape of the screw housing space R can be appropriately selected corresponding to the size and shape of the breathing hole 40.

What is claimed is:

1. A turn lamp unit integrally fittable to a side mirror for a vehicle, comprising:
    a housing to be fixed to the side mirror;
    a lens section fixed to the housing and disposed so as to be exposed from the side mirror;
    a reflecting member disposed in an inner space formed by the housing and the lens section, for reflecting light from a light source toward the lens section;
    a screw for fixing the reflecting member to the housing;
    a screw housing space arranged integrally with the housing so as to surround a periphery of a head portion of the screw disposed on the housing side;
    a breathing hole formed at the housing for communication between the inner space and the screw housing space; and
    a waterproof moisture-transmission section for sealing an opening of the screw housing space.

2. The turn lamp unit of claim 1, wherein the breathing hole is located on an upper side in the inner space in a state where the turn lamp unit is fitted to the side mirror.

3. The turn lamp unit of claim 1, wherein the breathing hole is located on an upper side of the screw in the screw housing space in a state where the turn lamp unit is fitted to the side mirror.

4. The turn lamp unit of any one of claim 1, wherein a control circuit substrate connected with the light source is disposed adjacent to the breathing hole.

5. The turn lamp unit of any one of claim 1, wherein the screw housing space is formed as a recessed portion depressed at an outer surface of the housing.

6. The turn lamp unit of any one of claim 1, wherein a boss section formed on a rear surface of the reflecting member is provided with a female screw section screwed with the screw; and a guide wall into which the boss section is fitted is formed on an inner surface of the housing.

7. The turn lamp unit of claim 6, wherein a part of the guide wall is cut off, and the breathing hole is exposed from the cut-off section.

* * * * *